United States Patent
Bach et al.

(10) Patent No.: US 9,175,737 B2
(45) Date of Patent: Nov. 3, 2015

(54) DRUM BRAKE MODULE WHICH CAN BE OPERATED BY ELECTRIC MOTOR

(75) Inventors: Uwe Bach, Niedernhausen (DE); Holger von Hayn, Bad Vilbel (DE); Ralf Sundheim, Urbach (DE); Wolfgang Ritter, Oberursel/Ts. (DE); Ahmed Sefo, Frankfurt (DE); Jürgen Balz, Hünstetten-Oberlibbach (DE); Jens Hoffmann, Darmstadt (DE); Martin Semsch, Maibach-Butzbach (DE); Götz Mehner, Königstein (DE); Dirk Sundheim, legal representative, Urbach (DE)

(73) Assignee: Continental Teves AG & Co. oHG (DE)

( * ) Notice: Subject to any disclaimer, the term of this patent is extended or adjusted under 35 U.S.C. 154(b) by 88 days.

(21) Appl. No.: 13/976,704

(22) PCT Filed: Feb. 2, 2012

(86) PCT No.: PCT/EP2012/051805
§ 371 (c)(1),
(2), (4) Date: Sep. 16, 2013

(87) PCT Pub. No.: WO2012/104395
PCT Pub. Date: Aug. 9, 2012

(65) Prior Publication Data
US 2014/0020997 A1    Jan. 23, 2014

(30) Foreign Application Priority Data

Feb. 2, 2011  (DE) .......................... 10 2011 003 544
Feb. 2, 2011  (DE) .......................... 10 2011 003 545

(51) Int. Cl.
*F16D 65/10*      (2006.01)
*F16D 51/10*      (2006.01)
(Continued)

(52) U.S. Cl.
CPC ................ *F16D 51/10* (2013.01); *F16D 51/16* (2013.01); *F16D 51/46* (2013.01); *F16D 65/16* (2013.01);
(Continued)

(58) Field of Classification Search
CPC ......... F16D 51/12; F16D 51/18; F16D 51/22; F16D 51/28; F16D 2121/24; F16D 2125/60; F16D 2125/62; F16D 2125/40
See application file for complete search history.

(56) References Cited

U.S. PATENT DOCUMENTS 5,310,026 A *  5/1994  Shaw et al. ................... 188/156
6,446,768 B2 * 9/2002  Kikuta et al. ................. 188/162
(Continued)

FOREIGN PATENT DOCUMENTS

DE    197 14 046 A1    10/1998
DE    198 26 785 A1    12/1999
(Continued)

OTHER PUBLICATIONS

International Search Report for PCT/EP2012/051805 mailed Sep. 19, 2012.
(Continued)

*Primary Examiner* — Anna Momper
(74) *Attorney, Agent, or Firm* — RatnerPrestia (57) ABSTRACT

A drum brake module for motor vehicles operable by electric motor and performs at least one parking brake function, having an electromechanical actuator mounted on one side of the armature plate and a rotational-translational movement converter converting a rotational drive rotational movement into a translational activation movement of brake shoes arranged on a side of the armature plate facing away from the actuator in a brake drum, and including at least one supporting device between the brake shoes such that the latter can carry out an activation movement in the direction of the brake drum. A drive nut is supported by the rotational-translational movement converter in an axially secure and rotatable fashion on the armature plate to assist the braking force. The drive nut drives a spindle arrangement mounted in a rotationally fixed and axially displaceable fashion and engages with an activation cable on at least one brake shoe.

22 Claims, 11 Drawing Sheets

(51) Int. Cl.
  *F16D 51/16* (2006.01)
  *F16D 51/46* (2006.01)
  *F16D 65/16* (2006.01)
  *F16D 65/22* (2006.01)
  *F16D 51/18* (2006.01)
  *F16D 51/12* (2006.01)
  *F16D 121/24* (2012.01)
  *F16D 125/24* (2012.01)
  *F16D 125/40* (2012.01)
  *F16D 125/60* (2012.01)

(52) U.S. Cl.
  CPC .............. *F16D 51/12* (2013.01); *F16D 51/18* (2013.01); *F16D 65/22* (2013.01); *F16D 2121/24* (2013.01); *F16D 2125/24* (2013.01); *F16D 2125/40* (2013.01); *F16D 2125/60* (2013.01)

(56) References Cited

U.S. PATENT DOCUMENTS

| | | | |
|---|---|---|---|
| 2001/0037919 A1 | 11/2001 | Kikuta et al. | |
| 2003/0038002 A1* | 2/2003 | Kapaan et al. | 188/327 |
| 2003/0089561 A1* | 5/2003 | Barbosa | 188/79.51 |
| 2009/0260929 A1* | 10/2009 | Boyle et al. | 188/156 |

FOREIGN PATENT DOCUMENTS

| | | |
|---|---|---|
| EP | 0 594 233 A1 | 4/1994 |
| EP | 0 920 390 B1 | 6/1999 |

OTHER PUBLICATIONS

Chinese Office Action mailed Mar. 27, 2015 in Chinese Application No. 20128007600.X.

* cited by examiner

DRUM BRAKE MODULE WHICH CAN BE OPERATED BY ELECTRIC MOTOR

CROSS REFERENCE TO RELATED APPLICATIONS

This application is the U.S. National Phase Application of PCT/EP2012/051805, filed Feb. 2, 2012, which claims priority to German Patent Application Nos. 10 2011 003 544.3, filed Feb. 2, 2011 and 10 2011 003 545.1, filed Feb. 2, 2011, the contents of such applications being incorporated by reference herein.

FIELD OF THE INVENTION

The present invention relates to a drum brake module for motor vehicles, which drum brake module can be operated by an electric motor and comprises the features of the preamble of the independent claims.

BACKGROUND OF THE INVENTION

A drum brake can in principle be embodied differently according to different construction principles (simplex, duplex, duo-duplex, servo, duo-servo). A uniform constructional advantage of drum brakes is their self-energizing effect in at least one direction of rotation, so that in principle it is possible to forego a brake power assist unit.

In order to achieve a parking brake function in an electromechanical manner, a central electromechanical actuator is conventionally provided in addition to the conventional hydraulic wheel brake actuating members of a service brake system, which central electromechanical actuator comprises an electric motor and a reduction gearing and also a threaded nut-spindle arrangement that influences at least one brake shoe of a drum brake by way of a comparatively long actuating pull. As a consequence, an electromechanical parking brake (EPB) is produced that is universally suitable not only for small vehicles and light vehicles but also for heavy vehicles.

Parking brakes than can achieve the parking brake function are known, said parking brakes are furthermore electromechanically actuable parking brakes having an expansion lock that is arranged in a guide in such a manner as to be axially displaceable (floating). The expansion lock comprises two actuating elements that can be displaced in a translatory manner and influence the brake shoes in a counter direction. In each case, a gear train having reduction gearing is integrated into the actuator so that the expansion lock acts directly on the brake shoes.

There is a need to improve the costs of constructing known electromechanically actuable drum brake parking systems and to reduce the installation space required by said systems. The parking brake cable pull systems having a central actuator are disadvantageous because it is necessary for the vehicle manufacturer to separately install and link the cable pull to the wheel brake, so that the process of finally assembling the actuator, actuating pull and wheel brake can only be performed at the assembly belt of the vehicle manufacturer which increases the complexity of production in this region. Vehicle manufacturers always desire a particularly cost-effective, modular vehicle production that is as uncomplicated as possible. In addition, the scope of function of a parking brake is to be extended to a potential service brake function.

For this reason, EP 0 920 390 B1, which is incorporated by reference, discloses an electromechanically actuable drum brake module having a particularly small overall installation size. An outer periphery of a cylindrical actuating unit is inserted through an orifice in an anchor plate. A rotatable drive nut is supported by way of the motor housing on a support plate. In order to shorten the structural length of the actuating unit it is provided that a rotor of a particularly embodied electric motor radially encompasses the outer side of a spindle arrangement and guides said spindle arrangement in a rotatably fixed manner. This type of construction requires an electric motor that is dimensioned in order to provide a comparatively high level of energy and comprises a special housing together with an especially adapted support plate.

An electromechanically actuable duo-servo drum brake without a cable pull linkage is known from EP 594 233 B1, which is incorporated by reference. An electric motor is arranged on a rear face of an anchor plate. The motor axis is arranged at a right angle with respect to the axis of rotation of a brake drum and drives a threaded spindle that is positioned in a rotatable and also axially non-displaceable manner. The threaded spindle is provided in parallel to the motor axis in the brake drum and is mounted in a housing. The threaded spindle engages an element that is mounted in an axially displaceable and non-rotatable manner in the housing, which element influences a lever gear. In addition to an electric motor that is dimensioned in order to provide a comparatively high level of energy, this type of construction still requires further components that are embodied in an extremely special manner and therefore do not allow any simple variation in the production series. Problems arise if the engine is switched off when the brakes are hot.

SUMMARY OF THE INVENTION

There is therefore a demand for a constructional principle for a drum brake module that can be produced in a cost-effective manner and can be installed in a simple manner by the vehicle manufacturer and that avoids the disadvantages of the prior art and in principle is suitable for the application as an electric service brake. Furthermore, there is a demand for an error-free and stable parking brake function that can be adapted in a simple manner for different types of vehicles and vehicle configurations, and wherein the drive train/gear train is nonetheless embodied in the simplest manner possible.

An aspect of the present invention relates to an integrated solution having a rotation to translation converter that is integrated in the actuator and is placed from the outside behind the anchor plate. A drum brake module according to claim 10 relates to a principle in the type of construction of the solution, in which the rotation to translation converter is placed, separately from the actuator, in the region of the brake shoes. The force flow of the application forces is immediately direct, in that a drive nut of the converter is supported, for supporting purposes, in an axially fixed and also rotatable manner on the anchor plate, and that the drive nut drives a spindle arrangement that is mounted in a rotatably fixed manner and also axially displaceable manner and engages with an actuating pull on least one brake shoe. As a consequence, it is possible to produce a drum brake module that is simple to assemble and can be operated by an electric motor, and wherein the actuating pull is preferably embodied as a short flexible cable pull that for the purpose of being assembled in a simple manner by the vehicle manufacturer is ready-finished articulated to a lever gear of a brake shoe, so that a process of installing a cable is omitted by the vehicle manufacturer. A particular advantage of the present invention resides in the fact that a separate production process with separate components is omitted, in that further use can be made of the drum brakes having a lever gear. This renders it possible to vary the series production in a simple manner in that it is possible to produce motor vehicles having conventional manually actuated brake elements without great expense alongside motor vehicles that have electromechanical actuating systems (cable pull systems having an actuating lever). The shortened actuating pull increases the efficiency because unnecessary friction is avoided.

By virtue of the fact that the cable pull or a gear element (lever) or for example a combination thereof is provided with a particularly defined level of elasticity, electric adjusting processes and electric control processes are improved and any distortion is avoided if the engine is switched off when the brakes are hot. It is therefore possible to switch off the engine when the brakes are hot and disadvantageous effects of a brake drum contracting are avoided without the need for a separate spring element.

A particularly rigid and effective construction that has low friction losses is rendered possible by virtue of the fact that at least one roller bearing is positioned in a force flow between the anchor plate and the drive nut and said roller bearing can be embodied as a grooved ball bearing or an axial bearing.

An advantage of this production procedure is that a multi-part gear housing is provided having a housing separation plane that extends parallel to and in a central manner with respect to an axle of a spindle arrangement. The axle of the spindle arrangement is arranged anti-parallel, at an inclined angle, with respect to the anchor plate. In an alternative embodiment, the housing separation planes or cover extend parallel to the anchor plate. Furthermore, a connecting piece is provided for receiving a displaceable spindle arrangement that is arranged in a centered manner in relation to a through-going orifice of the anchor plate and at least partially engages through the through-going orifice. By virtue of the fact that the rotation to translation converter is therefore integrated to a certain extent in the through-going orifice in an interface between the gear housing and the anchor plate, a compact drum brake module that requires a small amount of installation space is produced. The spindle arrangement can be embodied with particular advantage for a particularly effective, friction-free design having rolling bodies (rolling body spindle drive, ball screw drive).

It goes without saying that the actuator, in particular its gear housing that is produced in a one-part or multi-part construction, is sealed in particular in the region of its separation planes. In order to prevent any foreign media (fluid, wear debris, contamination) from passing in the region of an outlet orifice in the actuating pull into an inner chamber of the actuator and damaging said actuator in the long term, at least one sealing arrangement is provided in the region of the actuating pull and seals said region.

The sealing arrangement can be provided with a sealing lip that is essentially fixed in place with respect to the anchor plate and whilst performing an actuating movement the actuating pull is displaced relatively under said sealing lip. Alternatively, a sealing lip sits on the actuating pull and is displaced simultaneously with said actuating pull, which sealing arrangement comprises at least one elastic portion (concertina bellows, roll bellows) that compensates for the actuating movement. In any case, the sealing arrangement seals a gap between the gear housing and the actuating pull.

In the case of another solution to the problem with a modified gear train, the rotation to translation converter in the type of construction of the solution, in other words separately from the actuator, is articulated in a pivotable manner to the anchor plate as a lever in the region of the brake shoes, within the brake drum, and is connected to the actuating pull. The pivotable lever comprises at least one toothing arrangement that meshes with the spindle arrangement of the actuator. A defined elasticity and/or a change in elasticity during the actuating process facilitate the electric adjusting process and the electric control process. The elasticity of the lever can be modified for this purpose by means of one or more stops. A stop can be embodied as a separate limb of the lever. Furthermore, the lever can be provided with a separate elastic element (elastomer element, spring).

A modification that is further simplified as far as series production is concerned is possible for different applications whilst maintaining a like-part strategy relating to the anchor plate and actuator, by virtue of the fact that an adaptor is provided between the actuator and anchor plate. The adaptor can be provided as a one-part component of the gear housing or as a separate component.

In any case, the actuating pull is provided pre-mounted between the actuator and the lever gear of a brake shoe in such a manner that the production step of coupling the actuating pull to the wheel brake is rationalized and wherein furthermore it is no longer necessary to mount a cable pull central actuator in the motor vehicle. In other words, it is sufficient in principle to provide merely electrical connections between the actuator and the electronic control unit.

BRIEF DESCRIPTION OF THE DRAWINGS

The drawing shows various views, in parts schematic and in parts in different scales, cross section, view or perspective, in which.

DETAILED DESCRIPTION OF THE INVENTION

Like features are identified in the drawing in each case by like reference numerals.

A drum brake module 1 that can be actuated by means of an electric motor and is to be arranged on axle components of a motor vehicle comprises an anchor plate 2 having brake shoes 6a,b that are mounted thereon and are provided within a brake drum that is not illustrated. An actuator 3 that is operated by an electric motor is attached to an opposite lying face of the anchor plate 2 and said actuator engages one or more of the brake shoes 6a,b by way of a gear 4 and an actuating pull 5, which is connected downstream, in such a manner that this/these brake shoe(s) 6a,b can perform an actuating movement B in the direction towards the brake drum, in order to perform the function of a service brake and/or a parking brake. A supporting device 11 can be provided between the brake shoes 6a,b.

The gear 4 comprises a gear housing 8 that receives the motor 7 or at least supports the motor 7. The motor 7 consumes DC voltage, is mechanically or electronically commutated and is a favorably priced type that is available as standard.

Figure 1A:
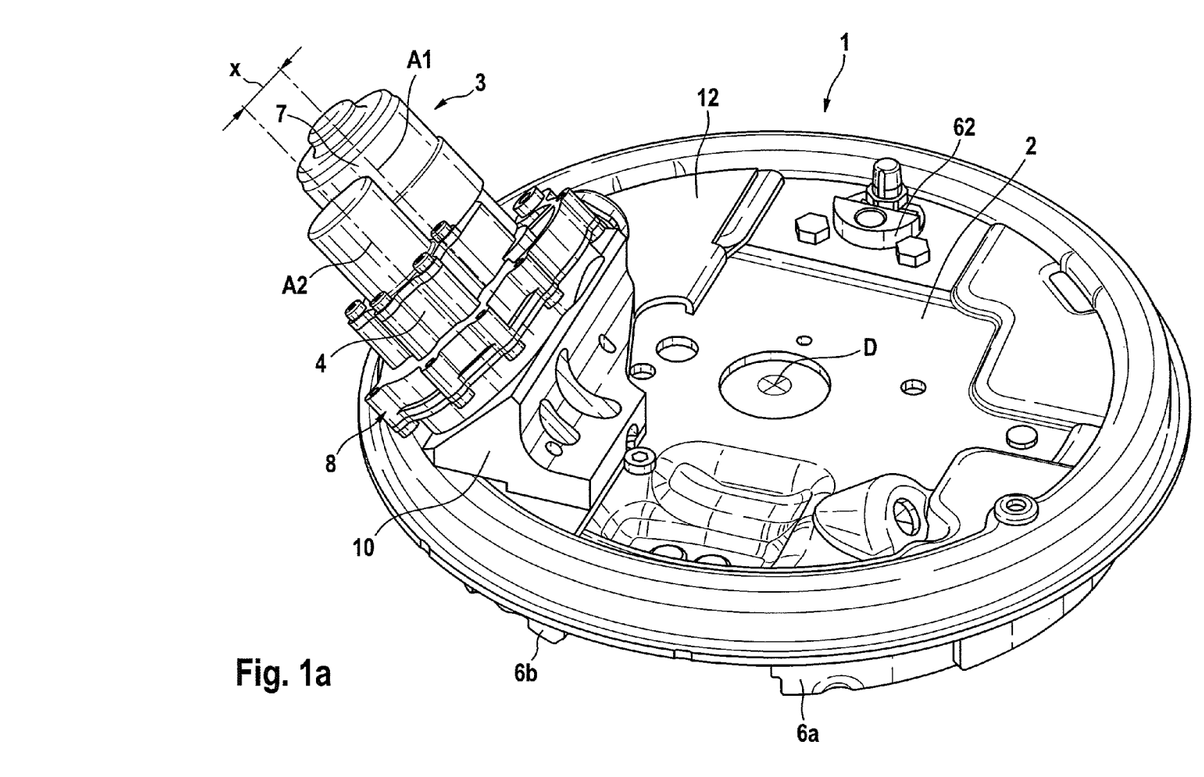
FIG. 1a shows a perspective rear view of an anchor plate together with an actuator.
Figure 1B:
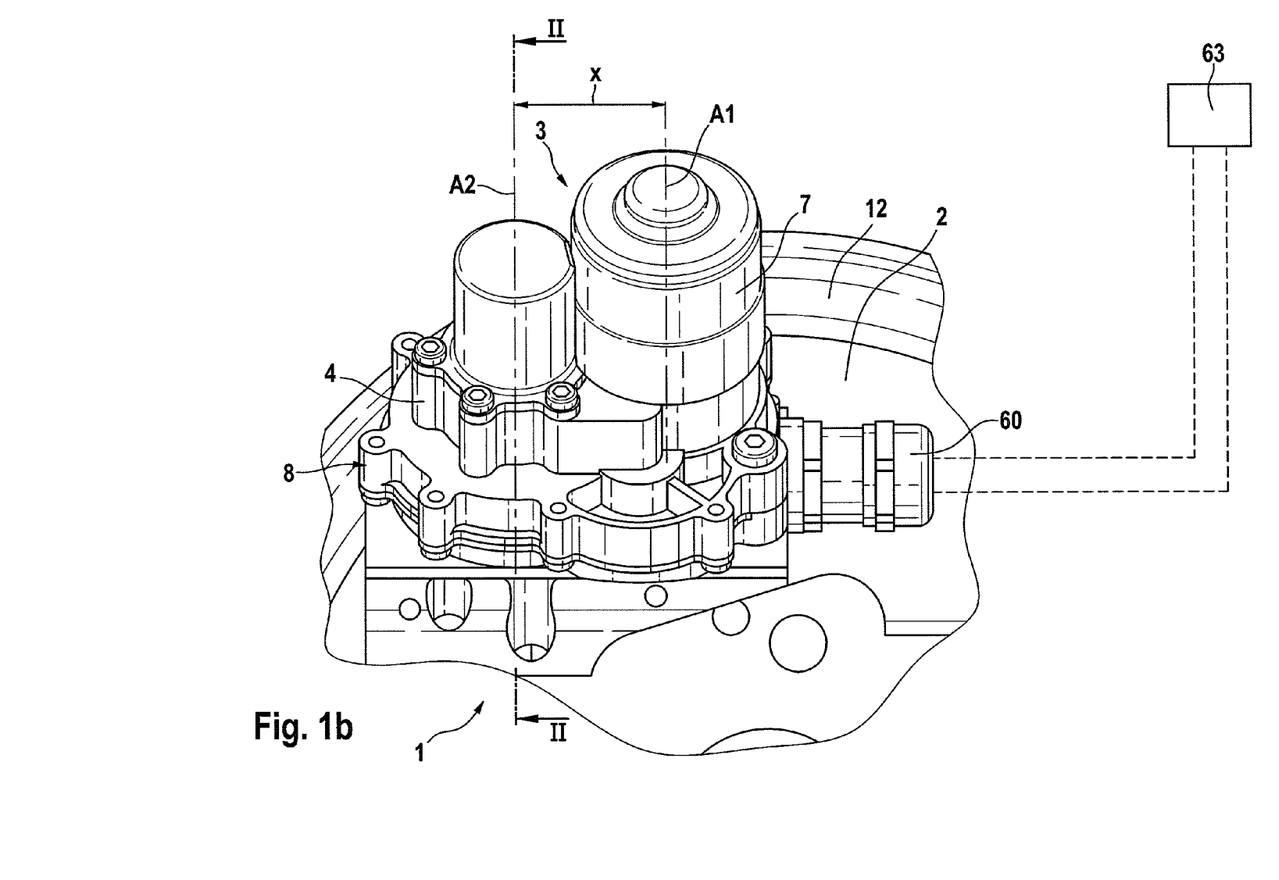
FIG. 1b shows a detailed view of the actuator as shown in FIG. 1a, FIG. 2a shows a cross-sectional view along the intersection II-II in FIG. 1 indicating the force flow of the actuating force.

FIGS. 1a,b illustrates that an axis A1 of the motor 7 is arranged at a distance x and also parallel with respect to an axis A2 of a spindle arrangement 9. It is common to all embodiments or solutions that an adaptor 10 is provided between the actuator 3 and the anchor plate 2 in order to render it possible to make adjustments and adaptations in a simple manner to suit different space and installation conditions in a motor vehicle. The adapter 10 is either a one-part component of the gear housing 8 or a separate component. A further feature of all the solutions resides in the fact that the actuator 3 is arranged opposite to the forwards travel direction of a vehicle, in other words it is arranged in relation to the forwards travel direction behind a wheel hub approximately in the 3 o'clock position with respect to the wheel hub and also tight against the anchor plate 2. As a consequence of which, the actuator 3 is particularly well protected against the environmental influences, such as weathering and stone-chippings. The short structural length of the actuator with a slight overhang U (by virtue of the parallel positions of the axes A1, A2) and the flexibility of the actuating pull 5 render it possible fundamentally to position said actuator on the anchor plate 2 in a freely adaptable manner.

The drive train and gear train of the solutions according to FIG. 1-4 comprise in this connection a multi-stage, in particular 2-stage toothed wheel gear and/or a belt gear and/or a worm gear and/or a planetary gear (mixed combinations of the aforementioned types are possible and desired) as a torque converter of the reduction type. A preferably two-stage gear train renders possible a reduction gear ratio in the range between approx. 7:1 to 25:1. If the lever gear that is connected downstream in the region of the brake shoes 6a,b achieves a reduction of approx. 5:1, a reduction gear ratio of approx. 125:1 is achieved. Added to this is an additional reduction effect of the rotation to translation converter that renders possible a total reduction effect by way of the overall drive train in a magnitude of at least approx. 250:1. In addition, this gear train considerably reduces the requirements with regard to costs and energy output of the motor 7.

Figure 6:
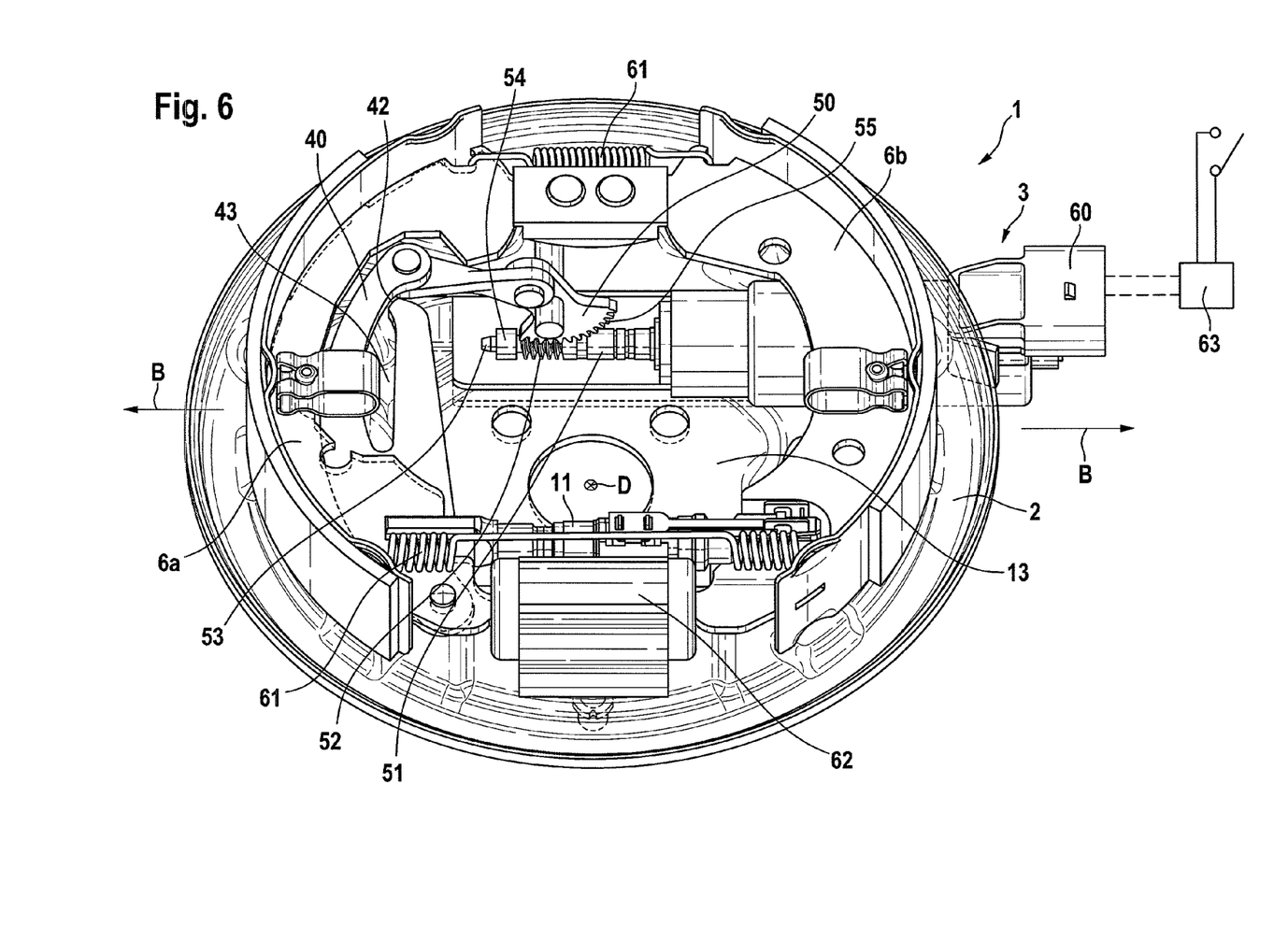
FIG. 6 shows a space-saving solution with a rotation to translation converter in the type of construction of the solution, partially within a brake drum.

The construction of the actuator is clearly visible in detail in FIG. 1-4. The actuator 3 is provided as a separate manageable component on a face 12 of the anchor plate 2. It is possible to integrate the rotation to translation converter as a spindle arrangement 9 in the gear housing 8 and in accordance with FIG. 2-4 to guide it in the gear housing in a rotatably fixed manner, in an easy accessible manner and also in a manner free of play. A modification to the embodiment resides in the fact that the rotation to translation converter is provided outside the gear housing 8 within the brake drum, and comprises as shown in FIG. 6 a spindle arrangement 9 or a pivotable lever 50 that is mounted on the anchor plate 2. The fastening arrangement is preferably provided in a flanged and releasable manner. Details of the fastening arrangement are provided with reference to the description of the FIG. 4 a-c hereinunder.

As is evident from FIG. 1a,b, the gear housing 8 is constructed from multiple parts. The gear housing 8 receives a plurality of gear components that are primarily used to convert the torque (low inlet torque, high outlet torque) and can also render it possible to perform a currentless parking brake function by means of a self-locking arrangement. Axes A1, A2 of the motor shaft and gear shaft are offset parallel to one another and at a distance X from each other. At least specific gear components can comprise at least in parts cost-effective synthetic material. It is preferred that a currentless self-locking arrangement is provided in the rotation to translation converter (spindle arrangement 9), so that the remainder of the gear train is in principle to a great extent relieved of the application forces.

In accordance with FIG. 1-5, the gear housing 8 receives at least partially in addition a rotation to translation converter assembly having the spindle arrangement 9 for converting the rotary drive rotational movement into a translation driven movement. As a consequence, the converter is inserted in order to be integrated in a space-saving manner in the known drum brake arrangements in a cost-effective and space-saving (compacted) manner in an interface between the actuator 3 and the anchor plate 2 and nonetheless guided in the gear housing so that it is not necessary at all to make any changes to the drum brake mechanics, in particular to the lever gear or to the anchor plate 2, in order to convert to an electromechanical actuating system.

For those applications that have a particularly effective, friction-reduced, electromechanical brake function, several rolling bodies are located between a mainly metallic drive nut and a mainly metallic spindle arrangement 9. A parking brake function is rendered possible in the case of "currentless variants of the solution" by means of a separate holding, locking or blocking device. A particularly advantageous device is, for example, known from DE 19826785 A1, which is incorporated by reference, the disclosed content of which is included herein in its full scope with respect to the principles of this holding device.

Figure 2A:
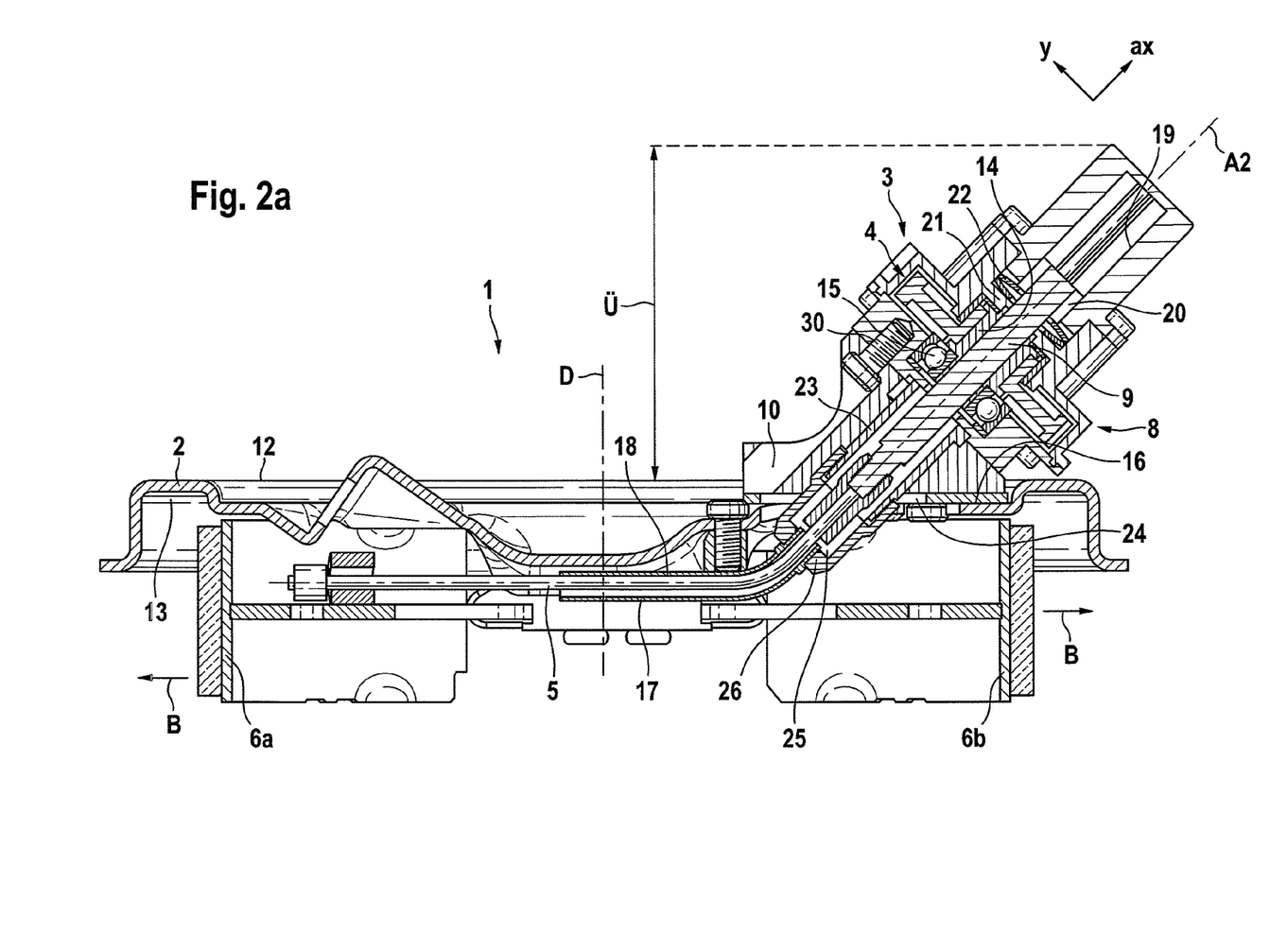
Figure 2B:
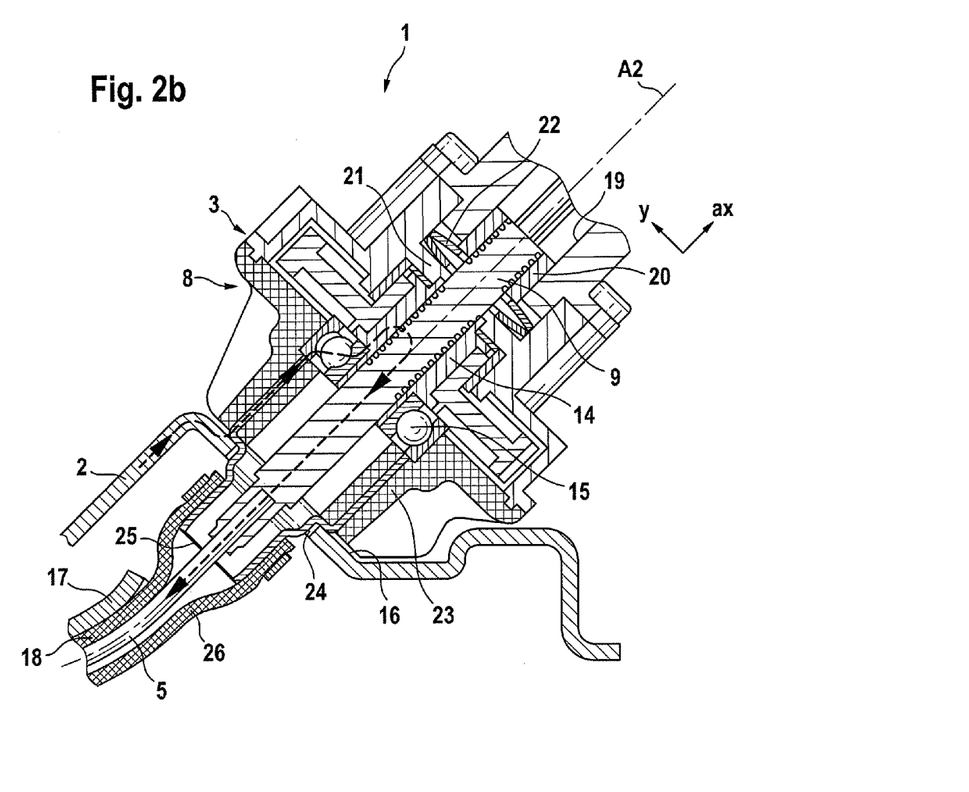
FIG. 2b shows in a cross-sectional view details of the actuator as shown in FIG. 2a, FIGS. 3a,3b show cross-sectional views of arrangements for sealing the actuator.

The force flow of the brake actuating force is—as is clearly evident in FIG. 2b as follows. Starting from the brake shoe 6a,b and the actuating pull 5, the pulling force passes by way of the spindle arrangement 9 into the drive nut 11. The metallic spacer bushing 34 is used to assist the brake force in a direct and rigid manner on a planar contacting surface 16. Said spacer bushing supports an outer ring of the bearing 15. The spacer bushing 34 is preferably formed from a synthetic material as an insertion part that is inserted in the gear housing 8. The bearing 15 is advantageously embodied as a low-friction roller bearing (inclined bearing, shoulder bearing, axial bearing or grooved ball bearing). The described bearing 15 also renders it possible to provide a radial facing bearing arrangement for the drive nut 14. As a modification to the embodiment, it is possible in order to support the drive nut 14 in a particularly precise and tilt-resistant manner to provide in each case a drive-side bearing and in addition an output-side bearing without having to abandon the invention.

Figure 3A:
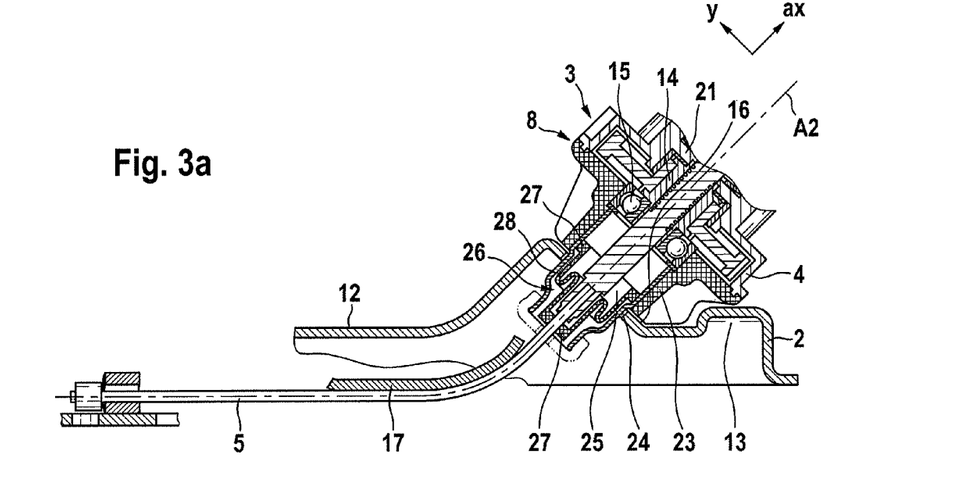
Figure 3B:
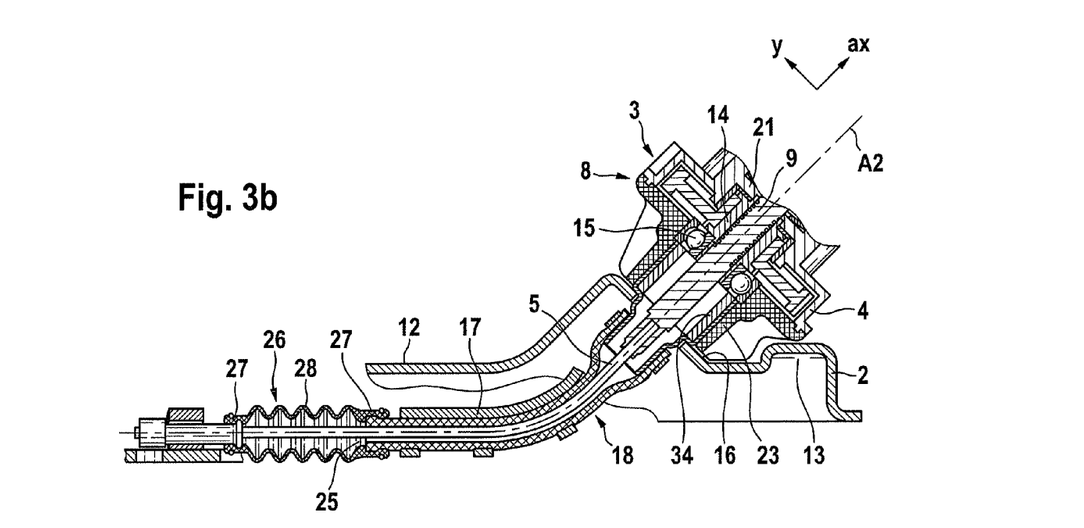

A guide 17 and a change in direction of the actuating pull 5 is achieved to a great extent in a friction-free manner, in that a layer of lubricant is provided and/or the actuating pull 5 is carefully routed in a curved manner with or without a sleeve 18. The sealing arrangement is tailored to suit the specific construction of the actuating pull 5 with or without a sleeve 18, as is evident by way of example in FIG. 3a,b.

The spindle arrangement 9 engages with the drive nut 11 and is positioned in the gear housing 8 in a rotatably fixed manner and also guided in an axially displaceable manner. For this purpose, the gear housing 8 comprises a prismatic or cylindrical guide 19 that comprises at least one or more connecting link elements that are tailored to suit and as positive fitting effective means contribute to the function of guiding and rotatably fixing said spindle arrangement. In order to render it possible to favorably disconnect the electrical supply to the actuator 3, the spindle arrangement 9 is provided with a stop 20 that is used for abutting against a housing-side counter bearing 21. Furthermore, at least one elastic element 22 is provided between the counter bearing 21 and the stop 20. The elastic element 22 is preferably embodied as a plate spring arrangement that renders it possible to achieve a rigid spring characteristic curve whilst requiring little installation space. This renders it possible in conjunction with a process of measuring and observing the current required by the motor 7 for the control unit 63 to automatically disconnect the electrical supply to said actuator in a favorable manner and in a good time.

The construction of the actuator in accordance with the invention and particularly in a compacted manner includes the fact that the spindle arrangement 9 is received at least partially and guided in a displaceable manner in a connecting piece 23 of the gear housing 8. The connecting piece 23 is arranged centrally in relation to a through-going orifice 24 of the anchor plate 2. It is preferred that the connecting piece 23 engages through the through-going orifice 24 in such a manner that at least a part of the spindle arrangement 9 can be pushed into the inside of the brake drum. This is also used to automatically center the actuating pull 5.

The actuator 3 is completely protected against the penetration of foreign media (contamination, wear debris, fluid) or to prevent the provided lubricant from escaping. In order to seal the gear housing 8, at least one sealing element 26 is provided for this purpose in the region of an outlet orifice 25 of the actuating pull 5. The sealing element 26 comprises at least one base body 27 that is fixed in place and at least one sealing lip that is essentially fixed in place and blocks a gap between the gear housing 8 and the actuating pull 5. In the case of a static arrangement of the sealing element 26, the actuating pull 5—whilst performing an actuating stroke—moves relative to the sealing lip (cf. FIG. 2a). In the case of another embodiment of a sealing arrangement as shown in FIG. 3a at least one elastic portion, which can move together with actuating pull 5, roll bellows or concertina bellows is provided in order to compensate in an elastic compensating manner for the actuating stroke. Another embodiment of a sealing arrangement (FIG. 3b) resides in the fact that the entire actuating pull 5 is provided with a sleeve 18. The sleeve 18 is arranged at the connecting piece 23 in a fundamentally hermetically sealed manner and terminates with a hermetically sealed arrangement in the region of an end fitting. The sealing arrangement is, like the guide 17 of the actuating pull 5, to a great extent embodied in a friction-free manner (coated with lubricant or lubricating means).

Figure 4A:
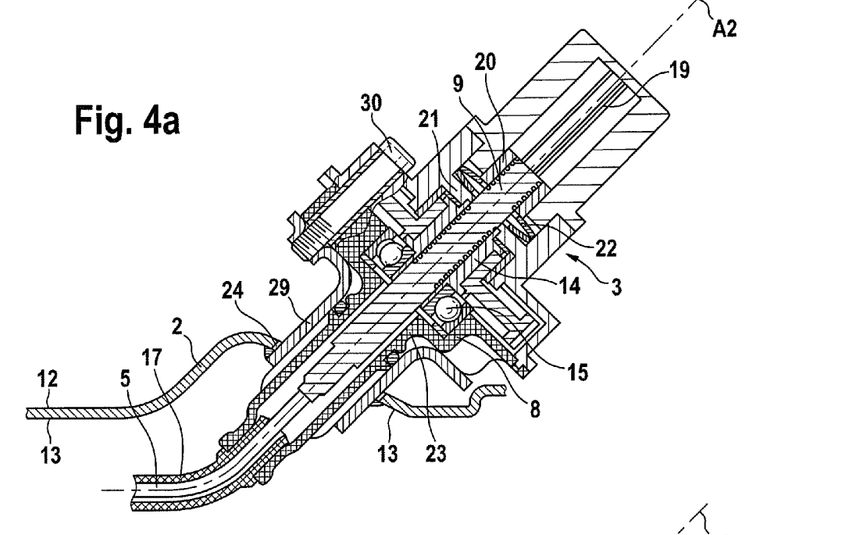
FIGS. 4a-c show details, each in a cross-sectional view, of alternative means of fastening the actuator to the anchor plate, FIGS. 5a,b show a pre-stressed lever gear with a defined level of elasticity.
Figure 4B:
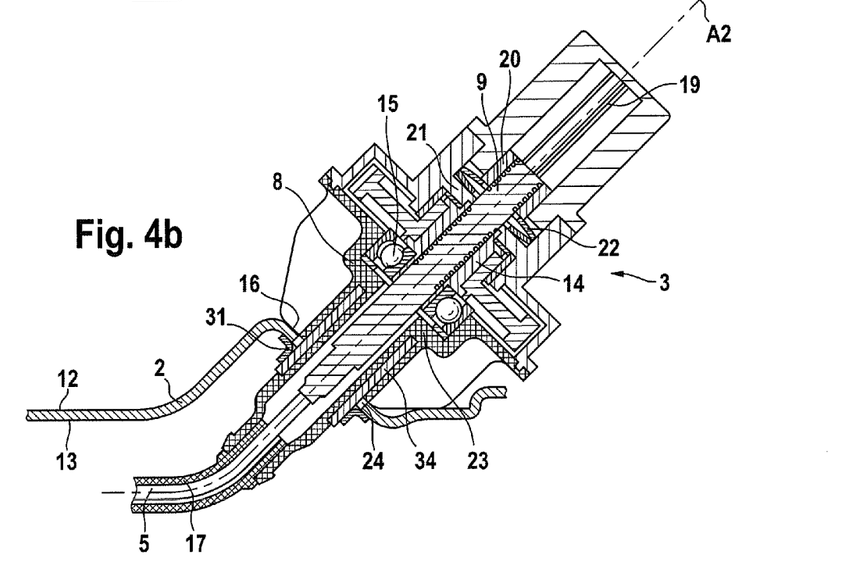

Low priced fastening interfaces between the anchor plate 2 and the actuator 3 are evident by way of example in FIGS. 4a-4b.

In accordance with FIG. 4a, a cylindrical flange component 29 for receiving the actuator 3 is in addition arranged for the purpose of adapting to the actuator 3 in a through-going orifice 24 of an anchor plate 2 of the conventional hydraulically actuated type. The connecting piece 23 is provided with a sealing element on the radial outer face and is inserted into the flange component 29 in a sealing manner. A plurality of screw fastening means 30 are used to provide the releasable fastening of the actuator 3 to the flange component 29, which screw fastening means are, in addition to the actuator 3, accessible in a maintenance friendly manner, in other words from outside the brake drum. The variant has the advantage that the anchor plate 2 for receiving the actuator 3 is adapted in a simple manner by means of the additional flange component 29, in other words the anchor plate 2 can still be produced and shaped using known tools fundamentally without a cutting process.

In the case of cost-effective, exemplary variants as shown in FIG. 4b, in order to provide a releasable fastening between the connecting piece 23 of the gear housing 8 and the anchor plate 2, a fastening means 31 is provided that is effective in a positive-locking or elastically clamping manner, said fastening means preferably being embodied as a retaining ring that engages in the inner region of the brake drum in a groove, or similar, of the connecting piece 23. It is necessary in order to dismantle the actuator 3 to remove the brake drum from the hub first. It is expedient to elastically pre-stress and seal the arrangement.

Figure 4C:
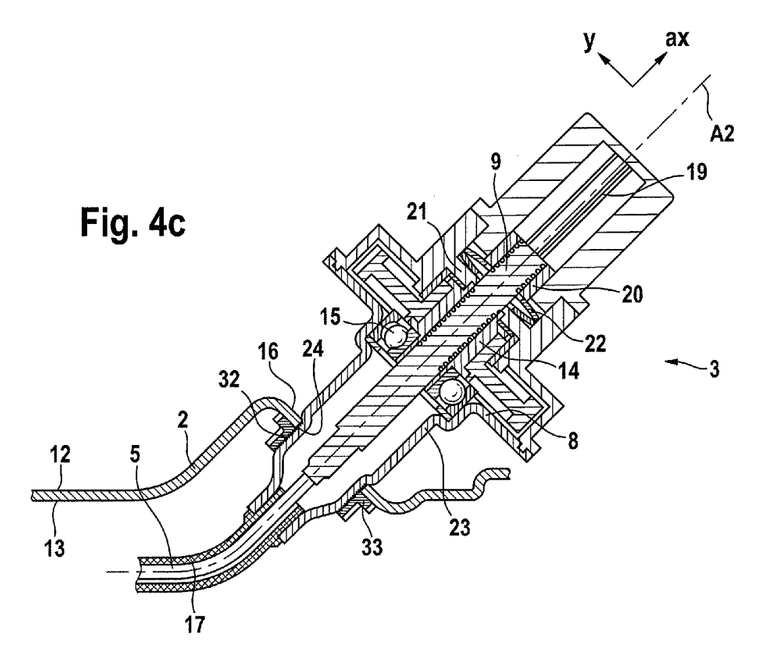

In the case of an embodiment as shown in FIG. 4c, the one outer thread 32 is provided on the connecting piece 23 and wherein a central threaded nut 33 is screwed onto the connecting piece 23. It goes without saying that a sealing arrangement is expedient for all the variants.

Figure 5A:
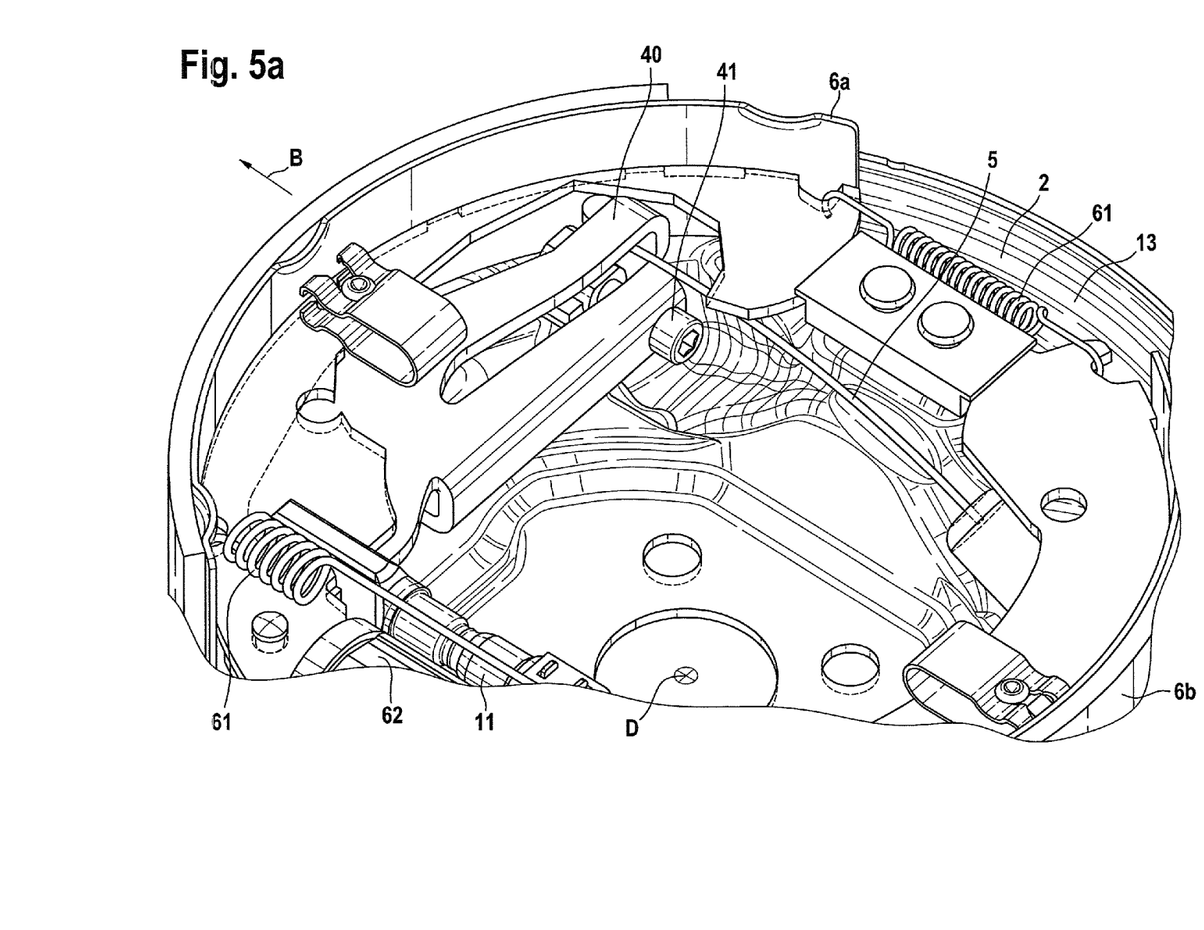
Figure 5B:
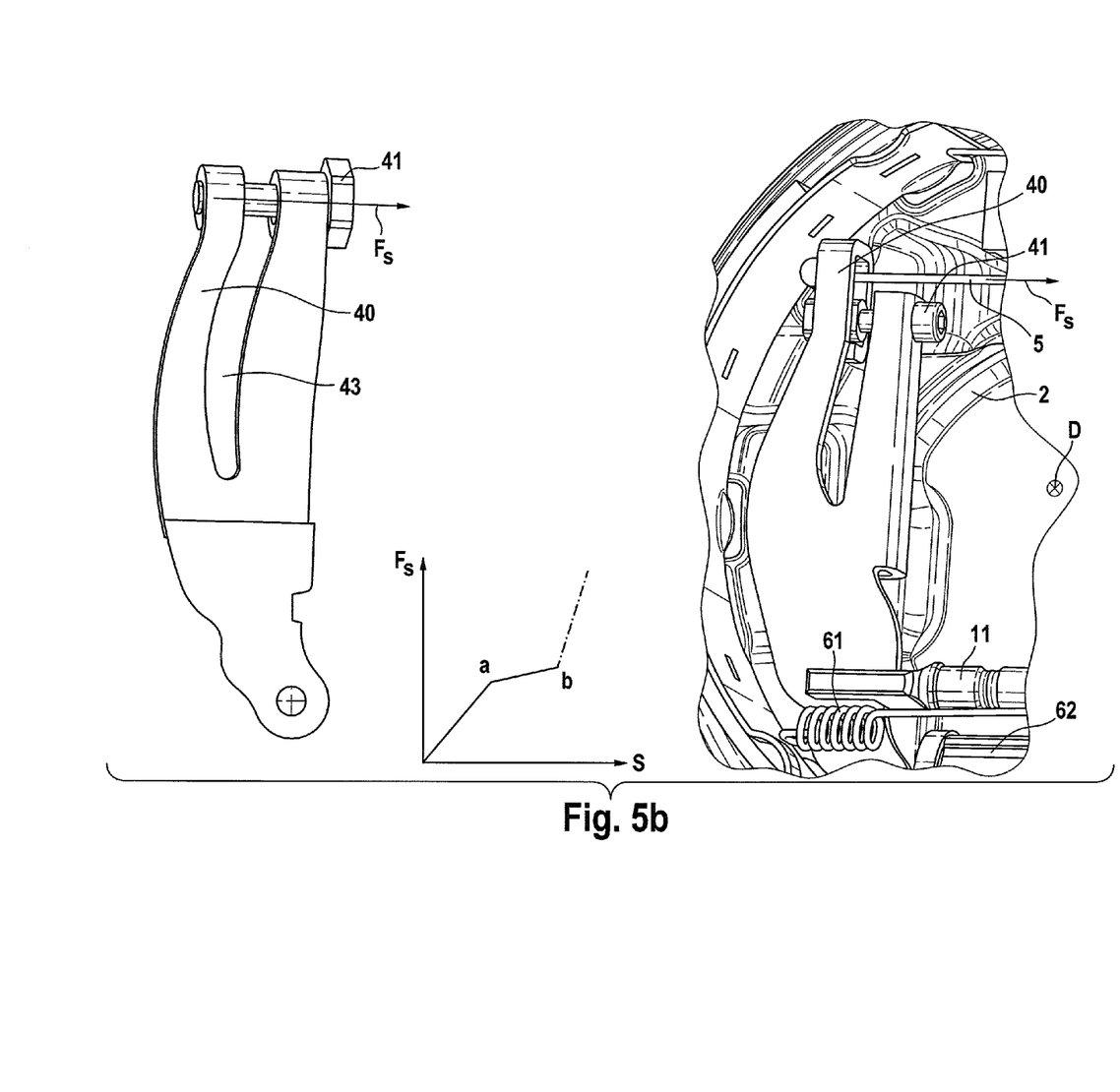
Figure 5C:
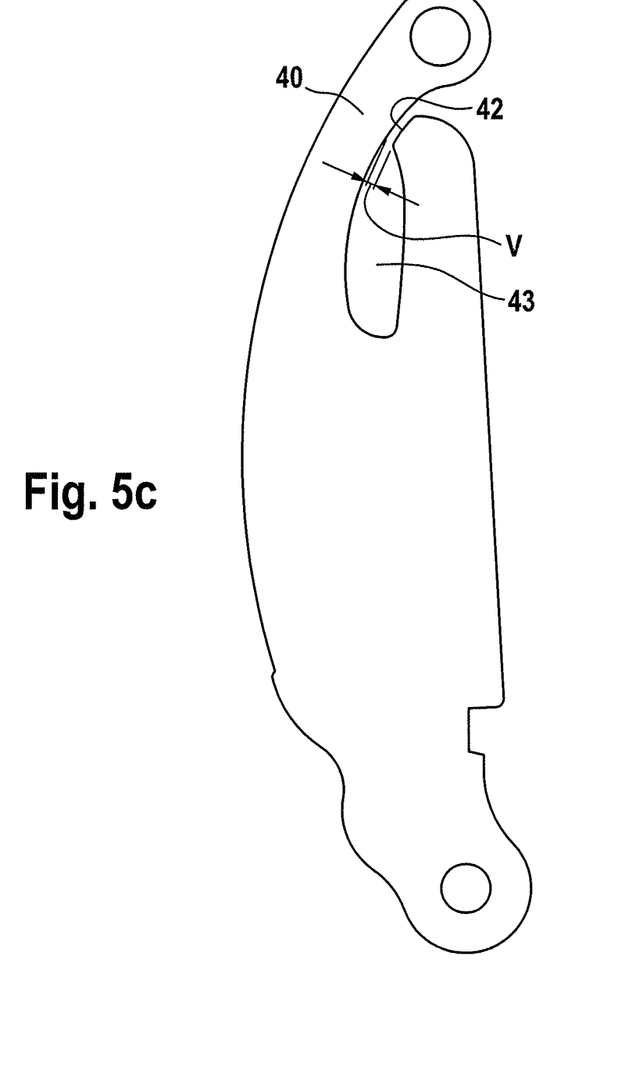
FIG. 5c shows a lever with an integrated stop.

The above described drum brake module 1 having the actuating pull 5 can be combined with a defined elastically embodied lever gear as described below, said lever gear being integrated within the brake drum. The lever gear comprises at least one defined elastic-resilient lever arm 40 that is articulated on the one hand to the of the actuating pull 5 and on the other hand to a brake shoe 6a,b, and wherein the lever arm 40 comprises a pre-defined spring characteristic curve. When the drum brake performs the function of a parking brake in the hot state, and the brake drum subsequently cools, which causes the brake drum to contract, the defined elastic resilience of the lever characteristic curve as shown in FIG. 5b prevents the drum brake from sticking or being damaged. The elastic lever arm 40 can be provided in particular in an elastic pre-stressed manner. For this purpose, a pre-stressing element 41 is provided that is embodied by way of example as a screw so that the pre-stressing effect can be adjusted. A stop that defines the deformation of the elastic lever arm 40 can be allocated to the lever arm 40. In the preferred embodiment as shown in FIG. 5b, a lever 40 comprises two fork-shaped, separate limbs of which one limb has the elastic function, and the other limb can assume a stop function for the other limb. The two limbs are arranged in the region of the stop 42 at a defined distance V from each other. By virtue of the pre-stressing arrangement and the stop 42 of the lever arm 40 it is possible using simple constructional means to recognize the application force in an improved manner on the basis of monitoring the current demand of the motor 7. It is not necessary to provide separate force sensors. The reason for this is that, as shown in FIG. 5b (middle image), the pre-stressing arrangement and the stop 42 cause considerable and therefore comparatively easy-to-sense changes (sharp bends) in an application force actuating path diagram, the progression of which corresponds essentially to a current demand actuating path diagram. The pre-stressing element 41 is provided in a pre-stressed state between the two limbs. It is preferred that the lever arm 40 is embodied from a planar flat material, in particular from a steel plate and that it comprises an essentially sickle-shaped outer contour, and wherein an essentially sickle-shaped cutout 43 is provided in order to form the two limbs.

It is possible to make adjustments for wear in principle electronically with reference to adjusting a restoring position of the actuator 3, wherein an idle travel is performed to a certain extent successively as the wear on the friction lining progresses.

In the event that the drum brake module 1 together with a hydraulic actuation is integrated in a motor vehicle brake system, wherein the electromechanical actuator is to perform exclusively the function of an electromechanical parking brake, and wherein a service brake function is performed in principle in a hydraulic manner, in each case in addition at least one wheel brake cylinder 62 having a piston is provided and also an automatic adjusting device is provided that can preferably be combined with the supporting device 11. The wheel brake cylinder 62 is located in relation to an axis of rotation D of the brake drum in the region of the supporting device 11 to a certain extent opposite the actuator 3, which can be operated by an electric motor. The electromechanical actuating device and the hydraulic/mechanical actuating device are arranged in parallel with each other.

The description hereinunder relates to another solution as shown in FIG. 6. A rotation to translation converter is provided separately from the actuator 3, said rotation to translation converter being placed with a spindle arrangement 52 within the brake drum, which further reduces the amount of installation space required. Only the differences with respect to the FIGS. 1-5 are described in this connection. Like features are provided with like reference numerals in the FIG. 6.

The rotation to translation converter of the actuator 3 is embodied without a drive nut. The reason for this is that a rotation to translation converter having at least one lever 50 that is articulated in a pivotable manner to the anchor plate is provided in the actuating pull 5 between the actuator 3 and the brake shoes 6, said lever being fully integrated within the brake drum. This reduces in addition the structural length of the actuator 3 and renders it possible to produce a type of construction of the solution, wherein the gear components for converting the torque are separate from those gear components for the conversion into the translation movement.

In a further embodiment of the invention, a driven shaft 51 of the actuator 3 having a thread-shaped spindle arrangement 52 is provided. The spindle arrangement 52 comprises an end 53 that is arranged in a rotatable manner in a bearing 54—preferably a roller bearing. The bearing 54 is fastened to or in the anchor plate 2 or is integrated in the anchor plate 2. In order to form a pivot lever gear, the spindle arrangement 52 is placed in the brake drum in such a manner that it meshes with a toothed arrangement 55 of the lever 50. The pitch of the toothed arrangement 55 is advantageously embodied in such a manner that a currentless self-locking arrangement is provided for the parking brake function. A defined elastic embodiment of the articulated lever 40 improves electronic switching processes and electronic control processes, because as a consequence it is possible to change the characteristic curve in a current progression in dependence upon the deformation. The lever 40 can be allocated one or more stops 42 in order to change the elastic deformation behavior that cause a change in the characteristic curve and as a consequence render it possible to perform a control process and an adjusting process in a simplified manner—without force sensors that perform direct measurements. A stop 42 can be embodied as a separate limb of the lever 40. A separate elastic element is allocated to the lever 40 in order to increase the influence. It goes without saying that all solutions and embodiments can comprise a plurality of elastic elements that are connected in series.

In order to provide an electrical connection to an electronic control unit 63 and/or to an electric switch, the actuator is provided with at least one electric female connector interface or electrical male connector interface 60. Metallic conductor rails (printed circuit) can be used to convey current in a gear housing 8 that is embodied from a synthetic material. It is possible by means of a replaceable pluggable adaptor part, which is inserted, to tailor the electric interface 60 in a simple manner to suit different requirements such as positions, precise connector embodiments or other customer requirements.

The actuator 3 is operated in the brake actuating direction in order to perform a brake application. As a consequence, the spindle arrangement 9 is displaced in FIG. 1-4- or the lever as shown in FIG. 6-against the elastic pre-stressing force of one or more spring elements 61 in the axial direction in such a manner that the required pulling force Fs is built up in the actuating pull 5. The brake shoes 6a, 6b are held against the brake drum and the application force is increased until an electronic control unit 63 emits a switch-off signal and the current supply is interrupted.

The motor 7 can be closed for a short period of time for the purpose of ensuring a brake actuation (parking brake operation). If the gear is designed in a self-locking manner, a currentless self-locking arrangement is consequently provided. It is possible to provide a separate parking brake locking device for other application cases.

In order to release a parking brake actuation, the actuator 3 is operated in reverse in the release direction. Each release operation is supported by an elastic restoring deformation—at least of the pre-stressed spring element 61—and is therefore performed in a particularly rapid manner. An elastic restoring deformation of the lever arm 40 or other elastic elements support the release process fundamentally in the identical manner.

Overall, the invention provides the vehicle manufacturer with the opportunity to produce a particularly cost-effective, simple installation of an electromechanically actuated drum brake module 1 in accordance with a so-called plug-and-play principle, by virtue of the fact that the drum brake module 1 is fastened in a simple mechanical manner to an axle component, and wherein only one electric interface 60 is produced in order to provide the electric supply to the actuator 3 having a control unit 63 and/or a switch. The result is that the necessary complexity of production for the vehicle manufacturer is as a consequence considerably reduced.

LIST OF REFERENCE NUMERALS

1 Drum brake module
2 Anchor plate
3 Actuator
4 Gear
5 Actuating pull
6 Brake shoes
7 Motor
8 Gear housing
9 Spindle arrangement
10 Adaptor
11 Supporting device
12 Outer face
13 Inner face
14 Drive nut
15 Bearing
16 Contact surface
17 Guide
18 Sleeve
19 Guide
20 Stop
21 Counter bearing
22 Elastic element
23 Connecting piece
24 Through-going orifice
25 Outlet orifice
26 Sealing element
27 Base body
28 Concertina bellows
29 Flange component
30 Fastening means
31 Fastening means
32 Outer thread
33 Threaded nut 34 Spacer bushing
40 Lever arm
41 Pre-stressing element
42 Stop
43 Cutout
50 Lever
51 Driven shaft
52 Spindle
53 End
54 Bearing
55 Toothed arrangement
60 Interface
61 Spring element
62 Wheel brake cylinder
63 Control unit
A1, A2 Axis
D Axis of rotation
Fs Application force
S Path
a,b Point of sharp bend
ax Axial
r Radial
Overhang
V Distance
X Distance

The invention claimed is:

1. A drum brake module for motor vehicles, which drum brake module can be operated by an electric motor, comprising an electromechanical actuator that is fastened to an outer face of an anchor plate for the purpose of operating a rotation to translation converter for converting a rotary drive rotational movement into a translation actuating movement of brake shoes that are arranged in a brake drum on an inner face of the anchor plate, which inner face is remote from the actuator, so that said brake shoes can perform an actuating movement in the direction towards the brake drum, wherein a drive nut of the rotation to translation converter is supported in an axially fixed and rotatable manner on the anchor plate in order to support the brake force, and wherein the drum brake module further comprises a lever movable in a defined elastic manner, the lever comprising a plurality of limbs, at least one of the limbs forming a stop that is positioned to change an elastic deformation of the lever as the lever is moved.

2. The drum brake module for motor vehicles, which drum brake module can be operated by an electric motor, as claimed in claim 1, wherein the drive nut drives a spindle arrangement that is mounted in a rotatably fixed manner and also in an axial displaceable manner in a gear housing, which spindle arrangement engages with an actuating pull on at least one of the brake shoes.

3. The drum brake module for motor vehicles, as claimed in claim 2, wherein a gear housing comprises a connecting piece for receiving the spindle arrangement.

4. The drum brake module for motor vehicles, as claimed in claim 3, wherein the connecting piece is arranged in a central manner in relation to a through-going orifice of the anchor plate, and wherein said connecting piece at least partially engages through a through-going orifice.

5. The drum brake module for motor vehicles, as claimed in claim 3, wherein at least one sealing arrangement is provided in the region of the actuating pull in order to prevent the ingress of foreign media into the actuator.

6. The drum brake module for motor vehicles, as claimed in claim 5, wherein the sealing arrangement comprises at least one base body that is arranged fixed in place and comprises at least one sealing lip that is provided essentially fixed in place, which sealing lip seals a gap between the gear housing and the actuating pull.

7. The drum brake module for motor vehicles, as claimed in claim 6, wherein an elastic portion, roll bellows or concertina bellows is provided between the base body and the sealing lip, and wherein the elastic portion, the roll bellows or the concertina bellows compensates in an elastic manner for an actuating stroke of the actuating pull.

8. The drum brake module for motor vehicles, as claimed in claim 5, wherein an elastic portion, roll bellows or concertina bellows is provided between the base body and the sealing lip, and wherein the elastic portion, the roll bellows or the concertina bellows compensates in an elastic manner for an actuating stroke of the actuating pull.

9. The drum brake module for motor vehicles, as claimed in claim 2, wherein roller bodies are provided between the drive nut and the spindle arrangement.

10. The drum brake module for motor vehicles, as claimed in 2, wherein the gear housing or the motor comprise at least one electrical interface that is embodied as a male connector or a female connector, said interface being used to provide an electrical connection to an electronic control unit and/or an electric switch.

11. The drum brake module for motor vehicles, as claimed in claim 1, wherein at least one bearing is arranged in a force flow between the anchor plate and the drive nut.

12. The drum brake module for motor vehicles, as claimed in claim 11, wherein the bearing is embodied as a grooved ball bearing or an axial bearing.

13. The drum brake module for motor vehicles, as claimed in claim 1, wherein the rotation to translation converter has at least one lever, which is articulated to the anchor plate in a pivotable manner, is provided in an actuating pull between the actuator and the brake shoes.

14. The drum brake module for motor vehicles, as claimed in claim 13, wherein the pivotable lever is arranged within the brake drum.

15. The drum brake module for motor vehicles, as claimed in claim 14, wherein the pivotable lever comprises at least one toothing arrangement that meshes with a spindle arrangement of the actuator, which spindle arrangement is mounted in a rotatable and axially non-displaceable manner.

16. The drum brake module for motor vehicles, as claimed in claim 13, wherein the pivotable lever comprises at least one toothing arrangement that meshes with a spindle arrangement of the actuator, which spindle arrangement is mounted in a rotatable and axially non-displaceable manner.

17. The drum brake module for motor vehicles, as claimed in claim 16, wherein the spindle arrangement comprises a free end that is mounted in a bearing in such a manner as to be able to rotate on the anchor plate.

18. The drum brake module for motor vehicles, as claimed in claim 1, wherein a pre-stressing element is coupled to the lever.

19. The drum brake module for motor vehicles, as claimed in claim 1, wherein the lever is provided in an elastically pre-stressed state.

20. The drum brake module for motor vehicles, as claimed in claim 1, wherein an adaptor is provided between the actuator and anchor plate.

21. A drum brake module for motor vehicles, which drum brake module can be operated by an electric motor, comprising an electromechanical actuator that is fastened to an outer face of an anchor plate for the purpose of operating a rotation to translation converter for converting a rotary drive rotational movement into a translation actuating movement of brake shoes that are arranged in a brake drum on an inner face of the anchor plate, which inner face is remote from the actuator, so that said brake shoes can perform an actuating movement in the direction towards the brake drum, wherein a drive nut of the rotation to translation converter is supported in an axially fixed and rotatable manner on the anchor plate in order to support the brake force, wherein a currentless self-locking arrangement of the rotation to translation converter is coupled to the actuator.

22. The drum brake module for motor vehicles, as claimed in claim 1, wherein in order to restore the actuator to an original position of the actuator, said actuator is pre-stressed in an elastic manner in the release direction in a permanently elastic manner by at least one elastically pre-stressed spring element or is pre-stressed by a plurality of spring elements that are connected in series.

* * * * *